United States Patent [19]

Doyle

[11] Patent Number: 4,750,180

[45] Date of Patent: Jun. 7, 1988

[54] ERROR CORRECTING METHOD FOR A DIGITAL TIME SERIES

[75] Inventor: Mark R. Doyle, Houston, Tex.

[73] Assignee: Western Atlas International, Inc., Houston, Tex.

[21] Appl. No.: 888,939

[22] Filed: Jul. 24, 1986

[51] Int. Cl.⁴ .............................................. G06F 11/00
[52] U.S. Cl. ........................................ 371/67; 360/53
[58] Field of Search ....................... 371/67, 68, 71, 24, 371/31, 44; 360/38.1, 48, 53; 358/336

[56] References Cited

U.S. PATENT DOCUMENTS

| 4,211,997 | 7/1980 | Rudnick | 371/51 X |
| 4,430,736 | 2/1984 | Scholz | 371/31 |
| 4,670,880 | 6/1987 | Jitsukawa | 371/67 X |

OTHER PUBLICATIONS

Halpenny, "A Method of Editing Time Series Observations", Geophysics, vol. 49, No. 5, pp. 521–524.
Nyman, "The Interpolation Error Operator", Time Series Error Detection and Correction, Geophysics, vol. 42, No. 4, pp. 773–777.

Primary Examiner—Jerry Smith
Assistant Examiner—Robert W. Beausoliel
Attorney, Agent, or Firm—William A. Knox; Barry C. Kane

[57] ABSTRACT

An analog signal is oversampled as a digital time series. The data samples are divided into an even and an odd sequence. Each sequence is independently low-pass filtered and the resulting two reconstructed sequences will be identical to each other and to the original if no isolated error is present in the original sequence. When the three sequences are not equal, an error exists. By noting the location or sample number of the error, the exact location of the error can be determined and the correctly reconstructed sample value can be used to replace the erroneous sample in the original sequence.

5 Claims, 2 Drawing Sheets

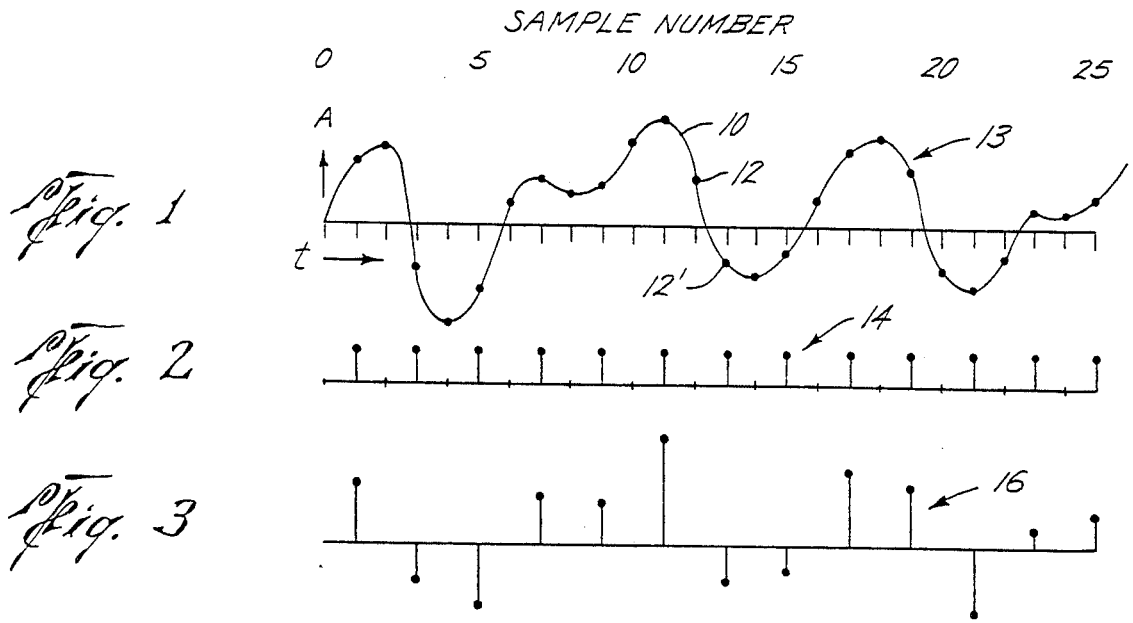
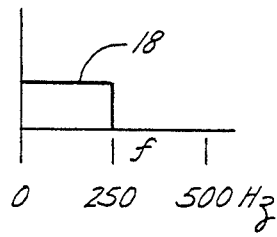
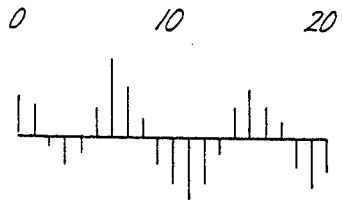
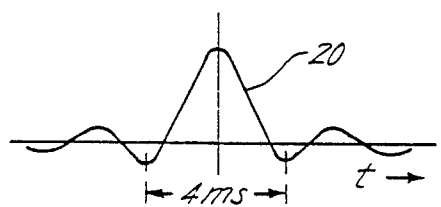
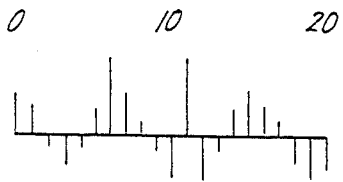

ERROR CORRECTING METHOD FOR A DIGITAL TIME SERIES

BACKGROUND OF THE INVENTION

1. Field of the Invention

A method for detecting and repairing isolated errors in a stream of digital data samples derived from an over-sampled analog signal.

2. Discussion of the Prior Art

Analog signals derived from measuring or sensing devices may be digitized as a series of digital data samples. The digital data samples may be telemetered to a remote observation site or recorded on a digital storage device such as a memory or a magnetic tape.

During telemetric transmissions or recording, bit dropouts occur or perhaps some form of interference imparts a false value to a data sample. Usually, such errors involve only a single isolated sample of the digital data stream. The term "isolated" means that there are no other errors immediately prior to or subsequent to the sample under consideration.

Most error correction methods fit a spline function or other type of smoothing function over several samples before and after a detected error. The erroneous sample is then replaced by an interpolated value from the smoothing function. Part of the problem is to detect the error without first making a visual inspection of the data.

It is an object of this invention to detect and repair an isolated error in a discrete digital data stream or time series without interrupting the data flow.

SUMMARY OF THE INVENTION

An analog signal is over-sampled by at least four times its bandwidth to produce a first discrete digital time series of digital data samples. A second discrete digital time series is generated from the even-numbered samples of the first time series. A third discrete digital time series is formed from the odd-numbered samples of the first time series. The second and third time series are independently digitally low-pass filtered to provide second and third reconstructions of the first time series. Upon comparison, the second and third reconstructed time series will be identical with the first original time series unless a significant error has occurred in the first time series. By noting the exact sample where the error occurs, the reconstructed value of the data sample is used to replace the erroneous value in the original, first discrete digital time series.

In a preferred aspect of this invention, the digital low-pass interpolation filter is zero-phase and the period of its impulse response is at least four times the period of the sample frequency.

In an aspect of this invention, a significant error is one which exceeds a preselected threshold value.

BRIEF DESCRIPTION OF THE DRAWINGS

The features and advantages of this invention will be better understood by reference to the drawings and detailed description wherein:

FIG. 1 is a digitized analog signal;

FIG. 2 is an operator for selecting odd or even samples of a discrete digital time series;

FIG. 3 is an example of a time series of odd-numbered samples;

FIG. 4 shows the bandpass characteristics of a preferred interpolation filter;

FIG. 5 is the impulse response of the filter of FIG. 4;

FIG. 6 is a 20-sample error-free discrete digital time series;

FIG. 7 is a 20-sample time series exhibiting a glitch at sample 11; and

DETAILED DESCRIPTION OF THE PREFERRED METHOD

Figure 8:
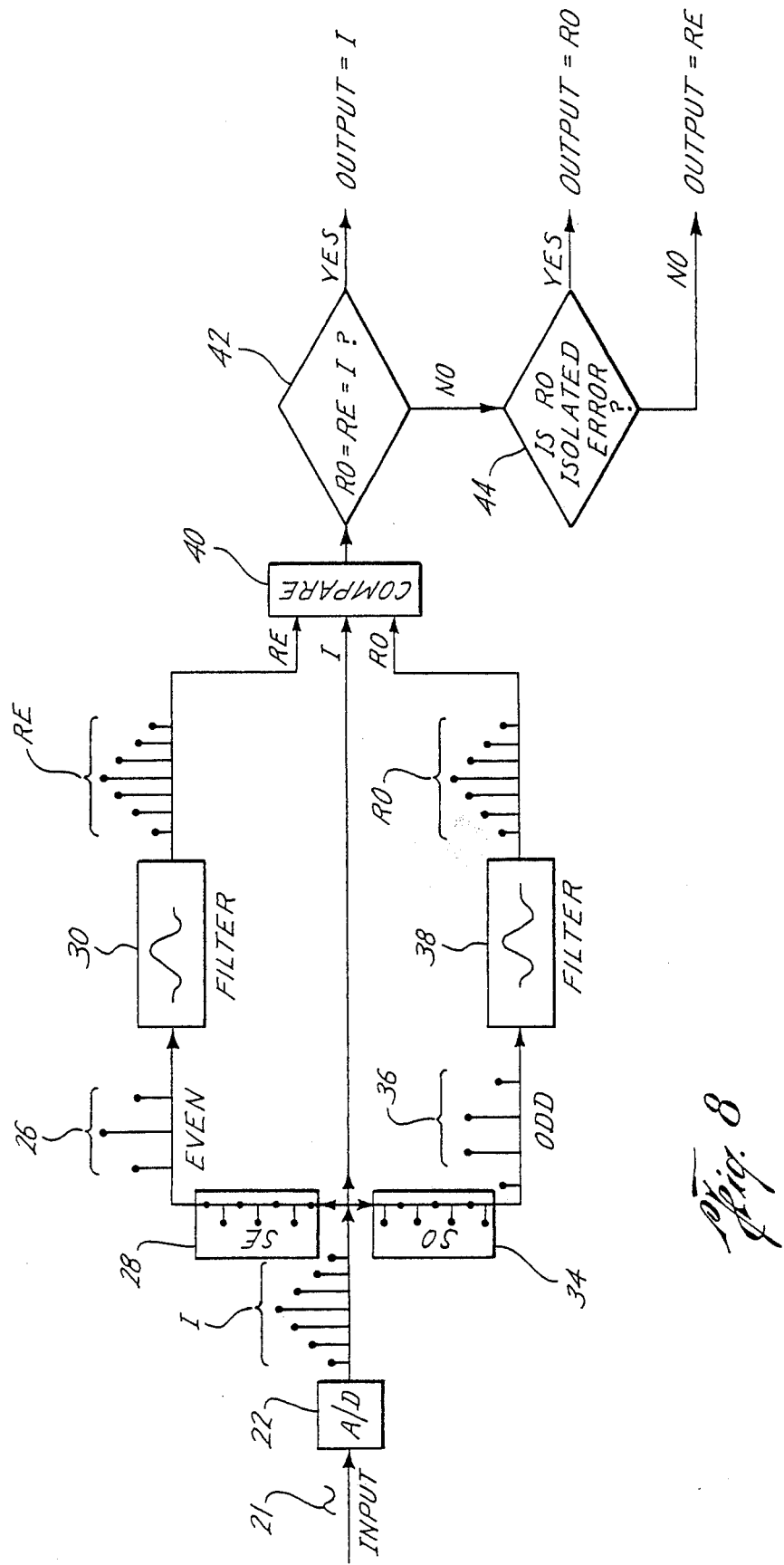
FIG. 8 is a schematic logic diagram useful for implementing the method of this invention.

Referring now to FIG. 1, there is shown an analog signal 10 that represents variations in the magnitude along the ordinate A, of some physical quantity as a function of time along the abscissa t. The amplitude of the analog signal as measured along ordinate A is some fraction of a full-scale value. The fractional value may vary from 0.0 to 1.0M, where M is the full scale value. The analog signal is sampled periodically, such as every millisecond (0.001 second), and is digitized by an analog-to-digital (A/D) converter, of any desired type, as a sequence of digital numbers such as 12, 12'. The sampling frequency is 1 kHz in the example. The sequence of digital numbers forms a discrete digital time series representative of the sampled values of the original analog signal.

For purposes of analysis, to be discussed later, it is convenient to divide the first original time series 13, represented by the samples such as 12, 12', into a second discrete digital time series consisting only of the even-numbered digital data samples and into a third discrete digital time series consisting of only odd-numbered data samples. That exercise can readily be performed by multiplying the original time series by a sample-selecting operator 14 consisting of alternate ones and zeros as shown in FIG. 2. The operator of FIG. 2 subsamples only the odd-numbered data samples as shown in FIG. 3.

We know from sampling theory, that the original analog signal can be reconstructed from a discrete digital time series provided the original signal has been sampled at a frequency that is at least twice the highest signal-frequency of interest. That requirement is dictated in order to prevent aliasing. If the signal is sampled at a greater frequency, it is said to be oversampled. Because we expect to divide the original time series into separate even and odd time series, the original time series must be at least twice oversampled so that the even and odd sequences wil have been at least minimally but adequately sampled. The average frequency of the signal 10 in FIG. 1 is about 152 Hz. Assuming a 1-ms sample interval or 1000-Hz sample frequency, the signal is more than twice oversampled.

The original discrete digital time series of FIG. 1 can be reconstructed from the odd discrete digital time series 16 of FIG. 3 by applying to it a digital interpolation filter of the form (sinx)/x as is well known from sampling theory. The filter 18 must have a pass band no wider than one-fourth of the sampling frequency, or in this case 250 Hz, as shown in FIG. 4 which shows the response of the filter in the frequency domain. The filter 18 of FIG. 4 is characterized by a zero-phase impulse response 20 having a period of 4 ms as shown in FIG. 5 which exhibits the filter response in the time domain. Assuming that there are no isolated bit dropouts or glitches in the original time series or in the subsampled time series 16, such as in FIG. 3, the digital reconstruction will be identical to the original. It should be recognized, however, that no filter is perfect. Therefore, there will be a small ripple difference between the reconstructed signal when compared with the original. The ripple difference defines a threshold value which should not exceed 54- to 60-dB (0.2 to 0.1%) down from full scale. Any difference substantially greater than that lower threshold level is considered to be significant and is a matter that needs attention. The level of the ripple difference is a function of the design parameters of the filter, hence, the threshold level is inherently set by the user to some arbitrary desired value.

FIG. 6 is a digital representation of an error-free signal. Application of a digital low-pass, zero-phase filter such as that of FIGS. 4 and 5 will produce a smooth reproduction of the original signal. FIG. 7 is a digital time series of a signal having a glitch at sample 11. The spike function represented by sample 11 will trigger the impulse response 20 of the filter to create spurious transients in the reconstructed series at that sample as well as at adjacent samples. Upon comparison with the original signal, significant errors will be seen.

The above comments will be better understood by reference to tables 1 and 2 below:

errors from a comparison of the original and reconstructed time series are 60 dB down or better, and therefore are not significant. Columns 6, 7 and 8 provide similar comparative data for the odd-numbered samples.

Table 2 involves a different problem. The time series of Table 2 is the same as that of Table 1 except that an error has been introduced at sample 7. The even-numbered time series of column 3 does not involve sample 7 so that when the low-pass, zero-phase filter is applied, the correct reconstructed time series of table 1 is recovered. However, upon comparison with the erroneous time series of column 2, table 2, a significant isolated error of 0.232 appears at reconstructed sample 7, which substantially exceeds some arbitrary threshold such as −54 dB (0.2%). Sample 7, whose error has been thus detected, can now be repaired by replacing the erroneous value −0.917 by the correct value −1.149 from the first reconstructed time series of Column 4.

The odd-numbered time series of column 6, does of course involve sample 7. The reconstructed time series reflects the impulse response 20 of the zero-phase, low-pass filter 18 and creates a cluster of significant-difference errors in adjacent data samples, thus confirming

TABLE 1

| Sample Number | Original Data | Even Data | Even Reconstruction | Difference Original − Even Reconstruction | Odd Data | Odd Reconstruction | Difference Original − Odd Reconstruction |
|---|---|---|---|---|---|---|---|
| 1 | −.108 | 0 | −.107 | −.001 | −.108 | −.107 | .001 |
| 2 | −.429 | −.429 | −.428 | −.001 | 0 | −.428 | .001 |
| 3 | −.262 | 0 | −.262 | .000 | −.262 | −.262 | .000 |
| 4 | .028 | .028 | .028 | .000 | 0 | .028 | .000 |
| 5 | .016 | 0 | .016 | .000 | .016 | .016 | .000 |
| 6 | −.454 | −.454 | −.454 | .000 | 0 | −.454 | .000 |
| 7 | −1.149 | 0 | −1.149 | .000 | −1.149 | −1.150 | .001 |
| 8 | −1.630 | −1.630 | −1.630 | .000 | 0 | −1.629 | −.001 |
| 9 | −1.577 | 0 | −1.577 | .000 | −1.577 | −1.577 | .000 |
| 10 | −1.027 | −1.027 | −1.027 | .000 | 0 | −1.027 | .000 |
| 11 | −.314 | 0 | −.315 | .001 | −.314 | .315 | .001 |
| 12 | .192 | .192 | .192 | .000 | 0 | .192 | .000 |
| 13 | .339 | 0 | .339 | .000 | .339 | .339 | .000 |

TABLE 2

| Sample Number | Original Data | Even Data | Even Reconstruction | Difference Original- Even Reconstruction | Odd Data | Odd Reconstruction | Difference Original- Odd Reconstruction |
|---|---|---|---|---|---|---|---|
| 1 | −.108 | 0 | −.107 | −.001 | −.108 | −.089 | −.019 |
| 2 | −.429 | −.429 | −.428 | −.001 | 0 | −.408 | −.021 |
| 3 | −.262 | 0 | −.262 | .000 | −.262 | −.283 | .021 |
| 4 | .028 | .028 | .028 | .000 | 0 | −.015 | .043 |
| 5 | .016 | 0 | .016 | .000 | .016 | .039 | −.023 |
| 6 | −.454 | −.454 | −.454 | .000 | 0 | −.308 | −.146 |
| 7 | −.917 | 0 | −1.149 | .232 | −.917 | −.941 | .024 |
| 8 | −1.630 | −1.630 | −1.630 | .000 | 0 | −1.484 | −.146 |
| 9 | −1.557 | 0 | −1.577 | .000 | −1.577 | −1.555 | −.022 |
| 10 | −1.027 | −1.027 | −1.028 | .001 | 0 | −1.070 | .043 |
| 11 | −.314 | 0 | −.314 | .000 | −.314 | −.336 | .022 |
| 12 | .192 | .192 | .192 | .000 | 0 | .212 | −.020 |
| 13 | .339 | 0 | .339 | .000 | .339 | .357 | −.018 |

Table 1 lists digital values for 13 samples of a selected discrete digital time series. The second column shows the original data of the first discrete digital time series. The third column shows a second discrete digital time series composed of even-numbered samples. Column 4 is the second reconstructed time series after applying a digital, zero-phase, low-pass filter to the second discrete digital time series. Column 5 indicates that the ripple the existence of the error in the original first discrete digital time series.

FIG. 8 is a schematic diagram of one means for carrying out the method of this invention. Analog signals 21 are input to an A/D converter 22 of any well-known type to provide an input I as a first discrete digital time series. A second discrete digital time series 26 is formed by passing time series I through even sample-selector operator 28. Time series 26 is filtered by a low-pass, zero-phase interpolation filter 30 to form a second reconstruction RE of the first time series I. First time series I is separately passed through odd sample-selector operator 34 to form a third discrete digital time series 36 which is filtered by low pass, zero phase interpolation filter 38 to form a third reconstruction RO of the first time series I.

Original first discrete digital time series I, second even discrete digital reproduction RE and third odd discrete digital reconstruction RO are compared in comparison logic 40 where decisions 42 and 44 are made. If RO, RE and I are identical, the first discrete digital time series I is accepted. If the three time series are not identical, decision 44 must be made. If RO shows a significant isolated error with respect to I, substantially exceeding the preselected desired threshold of the reconstructed odd series, then RO is accepted as the correct output signal. On the other hand, if RO shows a cluster of errors with respect to I, then the reconstructed even series RE is accepted as the correct output.

With the exception of A/D converter 22, which may be any suitable commercially-obtainable module, the operations indicated in FIG. 8 may be carried out with the aid of a general purpose digital computer or a special-purpose logic array may be assembled from conventional electronic components that are quite familiar to one skilled in the art. Alternatively, a microprocessor may be used.

The above description has been presented for illustrative purposes only. Other techniques will be apparent to those skilled in the art but which will be included within the scope and concept of this invention which is limited only by the appended claims.

I claim as my invention:

1. A method for detecting and repairing isolated errors in a first discrete digital time series consisting of digital data-sample values of an oversampled analog signal, comprising the steps of:

forming a second discrete digital time series from the even-numbered samples of said first discrete digital time series;

forming a third discrete digital time series from the odd-numbered samples of said first discrete digital time series;

applying a low-pass interpolation filter separately to said second and third discrete digital time series to form second and third reconstructions of said first discrete digital time series;

comparing a selected one of said reconstructions with said first discrete digital time series to detect a significant single-sample difference-value between said first discrete digital time series and said selected one reconstruction;

comparing the other of said reconstructions with said first discrete digital time series to detect a cluster of multiple data-sample differences between said first discrete digital time series and said other reconstruction, the center of said cluster corresponding to the single-sample difference detected on said one reconstruction, said single-value difference and said cluster of differences indicating an isolated error in said first discrete digital time series; and repairing the isolated error on said first discrete digital time series by substituting therefor the corresponding single-sample value from said selected one reconstruction.

2. The method as defined by claim 1 wherein the interpolation filter is zero-phase and its bandwidth is less than one-fourth of the sampling frequency.

3. The method as defined by claim 2 wherein the sampling frequency is at least four times the bandwidth of the analog signal to be sampled.

4. The method as defined by claim 3 further comprising the steps of:

defining a significant single-sample error as a value that exceeds a preselected threshold.

5. The method as defined by claim 4 wherein said preselected threshold is at least 54 dB down from the full-scale sample value for the entire discrete digital time series.

* * * * *